(12) United States Patent
Abatti, Jr.

(10) Patent No.: US 7,748,316 B2
(45) Date of Patent: Jul. 6, 2010

(54) METHOD OF ADDING MOISTURE TO A DOUBLE COMPRESSED BALE

(76) Inventor: Cinto A. Abatti, Jr., 2015 Silsbee Rd., El Centro, CA (US) 92243

( * ) Notice: Subject to any disclaimer, the term of this patent is extended or adjusted under 35 U.S.C. 154(b) by 0 days.

(21) Appl. No.: 11/843,622

(22) Filed: Aug. 22, 2007

(65) Prior Publication Data

US 2009/0049999 A1   Feb. 26, 2009

(51) Int. Cl.
*B30B 13/00* (2006.01)
(52) U.S. Cl. .......................................... 100/35; 100/73
(58) Field of Classification Search ...................... 100/2, 100/3, 35, 38, 39, 71, 73–75; 426/636; 99/487, 99/516; 56/10.2 B, 16.4 B, 341
See application file for complete search history.

(56) References Cited

U.S. PATENT DOCUMENTS

| 3,274,761 A | * | 9/1966 | De Buhr et al. | .......... 56/16.4 D |
| 4,918,910 A | * | 4/1990 | Sheehan et al. | .............. 56/341 |
| 5,010,809 A | * | 4/1991 | Williams | ..................... 100/35 |
| 2002/0068118 A1 | * | 6/2002 | Gombos et al. | ............. 426/132 |

\* cited by examiner

*Primary Examiner*—Jimmy T Nguyen
(74) *Attorney, Agent, or Firm*—Schmid PA

(57) ABSTRACT

Disclosed is a method of adding moisture to a double compressed bale. The method includes the steps of receiving a forage and separating the forage to form a separated forage. The method further includes applying a moisture stream to the separated forage to form a moisten forage. The moisten forage is then compacted to a density of greater than 20 pounds per cubic foot. Furthermore, the moisten forage may be compacted and reduced in volume from about 10:1 to 30:1.

4 Claims, 3 Drawing Sheets

METHOD OF ADDING MOISTURE TO A DOUBLE COMPRESSED BALE

FIELD OF THE INVENTION

Figure 1:
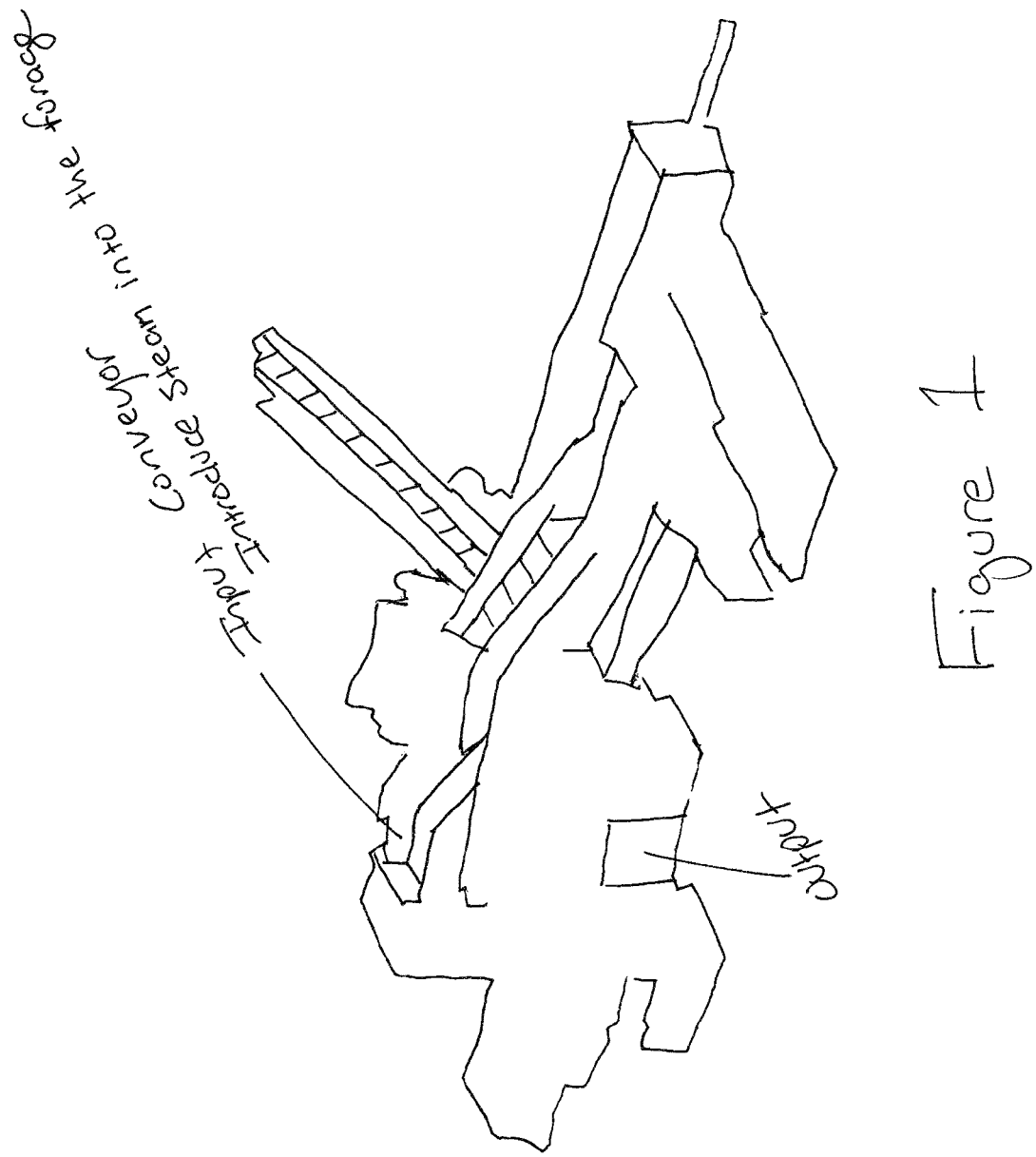

The present invention generally relates to a method for adding moisture to baled forage and more specifically the invention relates to a method of adding a moisture stream in the form of either a liquid or vapor to the forage prior to compression in the forming of a double compressed bale.

BACKGROUND

For shipping and storage, many types of fibrous material can be pressed and bound into bales. Such bales usually have a particular size and shape, depending upon the type and characteristics of the material in the bale and the type of baling machine used. Substantially uniform bales, particularly those having square or rectangular profiles, are advantageous because they usually require no packaging material other than wire, twine, or strapping to hold the bale together and because they can be tightly stacked with minimal space between bales.

A bale of fibrous material may be of relatively low density for any of various reasons. First, the material may contain moisture; a dense bale may not allow material in the interior of the bale to aerate properly, which may cause rotting. Second, an overly dense bale may damage the fibers, especially if they are not oriented properly relative to the compression and binding. Third, dense bales may be too heavy for a person to handle without equipment. Fourth, some materials may be extremely resistant to compaction, resulting in recoil forces on the bindings that exceed the strength of the binding materials. Fifth, material compressed too tightly may become too difficult to separate later when the bale is opened.

However, it is often desirable to bale fibrous material in the densest bale practicable because storage and shipping costs based on volume rather than weight will be lower with denser bales. If the particular material will permit, recompressing low-density bales into high-density bales especially for long-distance shipping may appreciably lower shipping costs, which will make the product more price-competitive in its destination market.

Mown and dried herbaceous forage for livestock is commonly baled for shipping and storage. Hay (alfalfa, timothy, grass, clover, etc.) and straw (stalks of wheat, oats, grass, etc.) are customarily bound in the field into several different types and sizes of bale, in both cylindrical (round bales) and rectangular solid shapes ("rectangular" and "square" bales) having a density of approximately six to ten pounds per cubic foot or less.

Unfortunately, compressing such forage to higher densities than the common density six to ten pounds per cubic foot can damage the plant structure and reduce the value of the compacted forage. Thus, what is needed is a method for compacting forage to greater densities that is capable of preserving the plant structure from shattering while retaining the value of the double compressed forage.

SUMMARY

The present invention generally relates to a method of adding moisture to a double compressed bale of forage. The addition of moisture as claimed in the present invention adds to the market value of the forage by improving both the texture and appearance of the forage. The method of adding moisture to the double compressed bale also aids in preventing the shattering of the forage plant and its leaf structure. Furthermore, the method of adding moisture to the forage also may improve the compressibility of the forage.

In greater detail, the present invention includes a method of adding moisture to a double compressed bale. The method includes applying steam to a separated forage and then compacting the steamed forage to a density of greater than 20 pounds per cubic foot. The applied steam can raise the total moisture content of the forage by between about 3 percent to about 10 percent.

Additionally, the method includes compacting the steamed forage to a density greater than 25 pounds per cubic foot and in a further embodiment to a density greater than 30 pounds per cubic foot. The total moisture content of the compacted streamed forage is typically less than 12 percent.

Furthermore, the method includes the steps of receiving a bound forage and separating the bound forage to form the separated forage. Additionally, the compaction of the steamed forage may be characterized as being compacted or reduced in volume from about 10:1 to 30:1. The steam added to the forage may further consist essentially of only vaporized water. Of course impurities or other additives commonly found in most municipal or rural water sources are included in the "consisting essentially of water" limitation of the present invention.

In a further embodiment of the present method, a liquid, as opposed to a vapor or steam, is applied to the separated forage. Once the liquid is applied to the forage it may then be compacted to a density of greater than 20 pounds per cubic foot in what is commonly known as the double compaction process. The liquid may be applied in a fine mist, whereby raising the total moisture content of the forage by between about 5 percent to about 8 percent. The liquid may consist essentially of water and when applied, moisten the forage to a total moisture content of the compacted moisten forage to less than 12 percent. The compacted moisten forage may be compacted and reduced in volume from about 10:1 to 30:1.

An additional embodiment of the present invention includes a method of adding moisture to a double compressed bale comprising the steps of receiving a bound forage and separating the bound forage to form a separated forage. The method further includes applying a moisture stream to the separated forage to form a moisten forage, wherein the moisture stream consists essentially of water. The method may then include compacting the moisten forage to a density of greater than 20 pounds per cubic foot. Furthermore, the moisten forage may be compacted and reduced in volume from about 10:1 to about 30:1.

DRAWINGS

Figure 2:
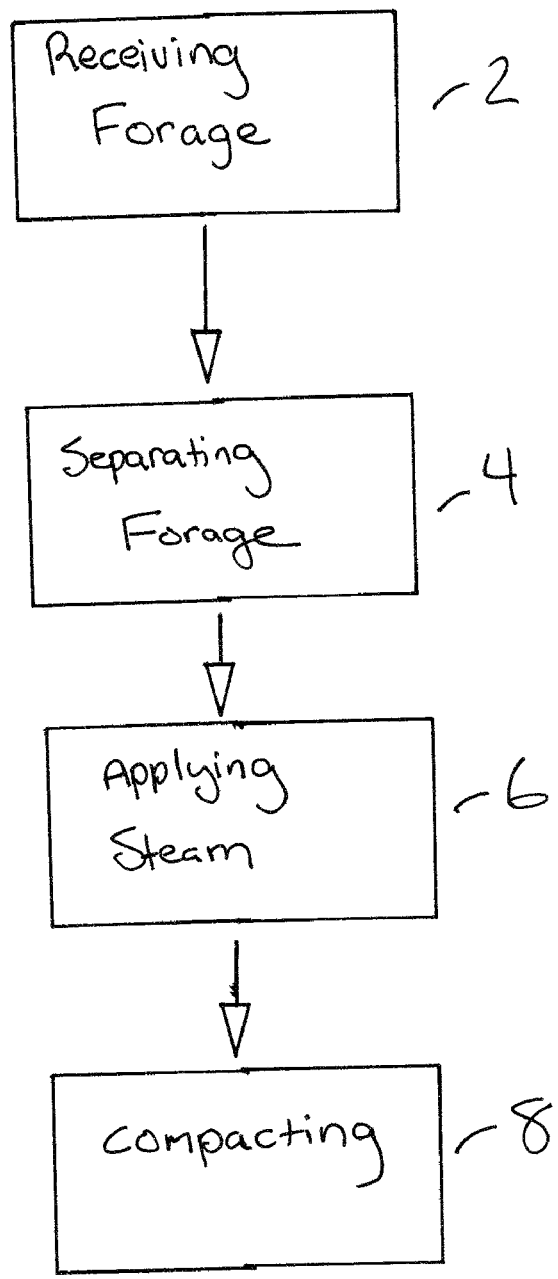
Figure 3:
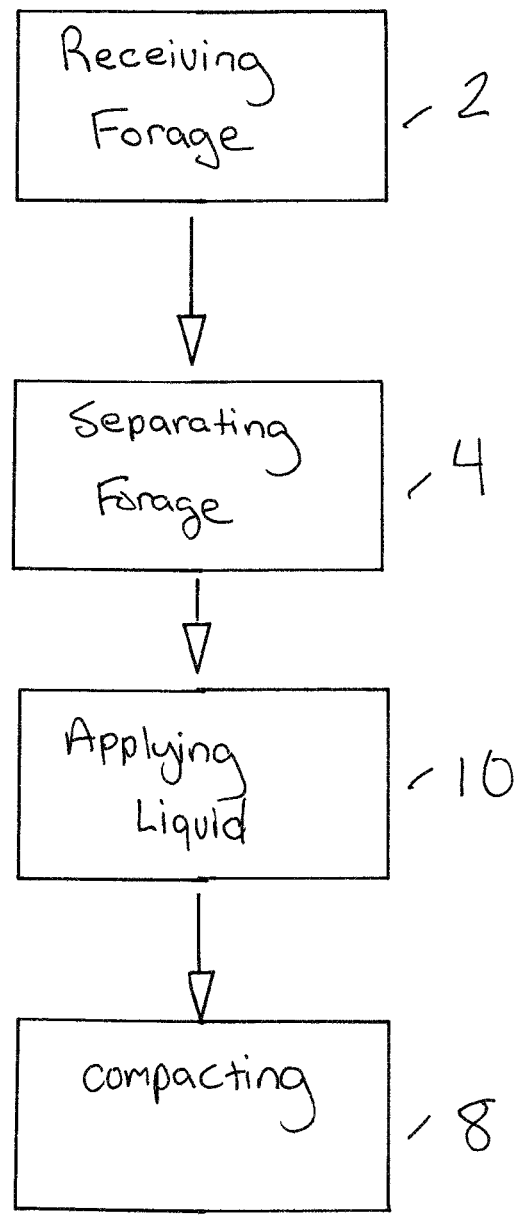

In the Drawings:

FIG. 1 illustrates one possible apparatus for forming double compressed bales, wherein there is shown one of many positions within such an apparatus that a moisture stream may be introduced to a forage prior to its compaction;

FIG. 2 is a block flow diagram depicting one embodiment of the present method, wherein the forage is received and separated and a steam is introduced or applied to the forage prior to its compaction and/or compression; and FIG. 3 depicts a block flow diagram illustrating a further embodiment of the present invention, wherein a forage is received and separated and a liquid is introduced or applied to the forage prior to its compaction and/or compression.

DETAILED DESCRIPTION

Disclosed is a method for adding moisture to a double compressed bale. The moisture is added to the forage prior to compression. Within the process a bound forage may be received and separated for adding the moisture and later compacting the moisten forage. The compacting process is typically known as double compression, a method of forming a bale of forage having a greater density than common field bales. Typically, the moisten forage is compacted to a density of greater than 20 pounds per cubic foot. The compressed finished bale may be further characterized as having reduced the volume of the uncompacted forage from about 10:1 to 30:1.

Referring now in greater detail to the drawings in which like numerals indicate like items throughout the several views, FIGS. 1-3 depict the present method of adding moisture to a double compressed bale, wherein the moisture is added to the forage prior to compression, in the various embodiments of the present invention.

FIG. 1 illustrates one possible apparatus for forming double compressed bales. The present method is not dependent upon any type of apparatus for forming a double compressed bale. The illustrated apparatus as depicted in FIG. 1 is only provided as an example of a possible apparatus for use in the present method. As shown in the figure, the moisture may be added at a point in the conveyer system of the apparatus prior to the compression or compaction of the forage. Thus, the forage may be compacted moist or damp which aids in the compaction of the forage and preservation of the forage plant structure. Of course, the moisture stream may be placed at most any position on the apparatus prior to the compression or compaction of the forage.

The moisture stream may be introduced to the forage using any device used to apply a liquid or vapor. By way of example and not limitation, the moisture may be introduced to the forage using a nozzle. The nozzle may be directed to apply the moisture to the forage from the top, bottom, side and/or a combination thereof as the forage passes along the conveyer system of the double compression apparatus.

The amount of moisture added to the forage is dependent upon the final desired moisture content of the double compressed bale. In one embodiment, the final total moisture content of the double compressed bale is less than 12 percent. Typically, the moisture stream added to the forage raises the total moisture content of the forage by between about 3 percent to about 10 percent. In a further embodiment, the moisture stream added to the forage raises the total moisture content of the forage by between about 4 percent to about 8 percent.

FIG. 2 illustrates a block flow diagram depicting one embodiment of the present invention. As illustrated, the present method includes a method of adding moisture to a double compressed bale comprising the steps of receiving 2 a bound forage. The term "bound" includes any harvested forage grouping. Forage is typically harvested in a bound state in the field into several different types and sizes of bale, in both cylindrical (round bales) and rectangular solid shapes ("rectangular" and "square" bales) having a density of approximately six to ten pounds per cubic foot or less. Additionally, the term "forage" in one embodiment may include any harvested fibrous plant material.

The method may further include in an embodiment, the separating 4 of the bound forage which has been received 2.

The separation 4 of the forage may be accomplished by any means and done to most any degree of separation. Typically, the separation 4 is such that moisture or steam 6 can be applied to the forage in an even manner. However such is not required by the present method and various degrees of separation are contemplated by the method.

The method further includes applying steam 6 to the separated forage to form a moisten forage. The steam may be comprised essentially of vaporized water. Of course impurities or other additives commonly found in most municipal or rural water sources are included in the "consisting essentially of water" limitation of the present invention. The duration and amount of steam applied 6 to the forage is dependent upon the desired final moisture content of the double compressed bale. In one embodiment, the final total moisture content of the double compressed bale is less than 12 percent. Typically, the steam added to the forage raises the total moisture content of the forage by between about 3 percent to about 10 percent. In a further embodiment, the steam added to the forage raises the total moisture content of the forage by between about 4 percent to about 8 percent.

As shown in FIG. 2, the method further includes compacting 8 the moisten forage to a density of greater than 20 pounds per cubic foot. A further embodiment includes compacting 8 the moisten forage to a density of greater than 25 pounds per cubic foot and in a further embodiment compacting 8 the moisten forage to a density of greater than 30 pounds per cubic foot. Furthermore, the moisten forage may be compacted 8 and reduced in volume from about 10:1 to 30:1.

FIG. 3 depicts a further block flow diagram illustrating an additional embodiment of the present invention wherein the forage is received 2 and separated 4 and a liquid is applied 10 to the forage prior to the compaction 8 or compression step. As described under FIG. 2, the steps of the present method illustrated in FIG. 3 are the same with the exception being, the moisture added to the forage is in the form of a liquid instead of steam 10. The liquid stream applied 10 to the forage is typically water. Additionally, in one embodiment, only water which is substantially free of other additives except for those commonly found in a water source is applied 10 to the forage.

The amount of water applied 10 to the forage is dependent upon the desired final moisture of the double compressed bale. In one embodiment, the final total moisture content of the double compressed bale is less than 12 percent. Typically, the water applied 10 to the forage raises the total moisture content of the forage by between about 3 percent to about 10 percent. In a further embodiment, the water applied 10 to the forage raises the total moisture content of the forage by between about 4 percent to about 8 percent.

While Applicants have set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

The invention claimed is:

1. A method of adding moisture to a double compressed bale comprising the steps of:
   receiving a bound forage;
   separating the bound forage to form a separated forage;
   applying a liquid to a separated forage to form the moisten forage;
   compacting the moisten forage to a density of greater than 20 pounds per cubic foot; and wherein the applied liquid raises the total moisture content of the forage by between about 5 percent to about 8 percent, wherein the moisten forage is compacted and reduced in volume from about 10:1 to 30:1, and wherein the final total moisture content of the compacted moisten forage is less than 12 percent.

2. The method of adding moisture to a double compressed bale in claim 1, wherein the liquid is applied as a fine mist.

3. The method of adding moisture to a double compressed bale in claim 1, wherein the forage is compacted to a density greater than 30 pounds per cubic foot.

4. The method of adding moisture to a double compressed bale in claim 1, wherein the liquid consists essentially of water.

* * * * *